(12) United States Patent
Surdoval et al.

(10) Patent No.: US 9,564,643 B2
(45) Date of Patent: Feb. 7, 2017

(54) ENGINEERED GLASS SEALS FOR SOLID-OXIDE FUEL CELLS

(71) Applicant: UT-BATTELLE, LLC, Oak Ridge, TN (US)

(72) Inventors: Wayne Surdoval, Monroeville, PA (US); Edgar Lara-Curzio, Lenoir City, TN (US); Jeffry Stevenson, Richland, WA (US); Joseph Thomas Muth, Somerville, MA (US); Beth L. Armstrong, Clinton, TN (US); Amit Shyam, Knoxville, TN (US); Rosa M. Trejo, Eden Prairie, MN (US); Yanli Wang, Knoxville, TN (US); Yeong Shyung Chou, Richland, WA (US); Travis Ray Shultz, Morgantown, WV (US)

(73) Assignees: UT-BATTELLE, LLC, Oak Ridge, TN (US); BATTELLE MEMORIAL INSTITUTE, Richland, WA (US)

( * ) Notice: Subject to any disclaimer, the term of this patent is extended or adjusted under 35 U.S.C. 154(b) by 666 days.

(21) Appl. No.: 13/949,964

(22) Filed: Jul. 24, 2013

(65) Prior Publication Data
US 2015/0030963 A1     Jan. 29, 2015

(51) Int. Cl.
  *H01M 2/08*   (2006.01)
  *H01M 8/02*   (2016.01)
  *C03C 8/24*   (2006.01)
  *C03C 14/00*  (2006.01)
  *H01M 8/12*   (2016.01)

(52) U.S. Cl.
  CPC ............ *H01M 8/0282* (2013.01); *C03C 8/24* (2013.01); *C03C 14/002* (2013.01); *C03C 14/004* (2013.01); *H01M 8/0286* (2013.01); *C03C 2214/30* (2013.01); *H01M 2008/1293* (2013.01); *Y02E 60/50* (2013.01); *Y02E 60/525* (2013.01); *Y02P 70/56* (2015.11)

(58) Field of Classification Search
  CPC .............. H01M 8/0282; H01M 8/0286; H01M 2008/1293; C03C 8/24; C03C 14/002; C03C 14/004; C03C 2214/30; Y02E 60/525; Y02E 60/50; Y02P 70/56
  USPC ........................................................ 429/509
  See application file for complete search history.

(56) References Cited

U.S. PATENT DOCUMENTS

| 2009/0295045 A1* | 12/2009 | Akash | ............... B32B 18/00 264/640 |
| 2011/0269053 A1* | 11/2011 | De Rose | ............... C03C 8/24 429/465 |

OTHER PUBLICATIONS

Chou et al., "Compliant alkali silicate sealing glass for solid oxide fuel cell applications: Thermal cycle stability and chemical compatibility", Journal of Power Sources (2011)196: 2709-2716.

(Continued)

*Primary Examiner* — Gary Harris
(74) *Attorney, Agent, or Firm* — Fox Rothschild LLP (57) ABSTRACT

A seal for a solid oxide fuel cell includes a glass matrix having glass percolation therethrough and having a glass transition temperature below 650° C. A deformable second phase material is dispersed in the glass matrix. The second phase material can be a compliant material. The second phase material can be a crushable material. A solid oxide fuel cell, a precursor for forming a seal for a solid oxide fuel cell, and a method of making a seal for a solid oxide fuel cell are also disclosed.

19 Claims, 7 Drawing Sheets

(56) References Cited

OTHER PUBLICATIONS

Fergus, "Sealants for solid oxide fuel cells", Journal of Power Sources (2005) 147: 46-57.
Mahapatra et al., "Glass-based seals for solid oxide fuel and electrolyzer cells—A review", Science and Engineering: R: Reports (2010) 67: 65-85.
Trejo et al., "Physical and mechanical properties of barium alkali silicate glasses for SOFC sealing application", International Journal of Applied Glass Science (2012) 3(4): 369-379.

* cited by examiner

ENGINEERED GLASS SEALS FOR SOLID-OXIDE FUEL CELLS

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to solid oxide fuel cells, and more particularly to seals for solid oxide fuel cells.

BACKGROUND OF THE INVENTION

Planar solid oxide fuel cell stacks are comprised of alternating fuel and air chambers, which are sealed from each other and connected to fuel and air delivery manifolds, respectively. Seals must have low electrical conductivity, be chemically and mechanically stable at high temperature in dual environments, moist reducing and oxidizing, and be chemically compatible with the cell and interconnect materials of the particular cell/stack design. Fuel leakage should be less than one percent (1%) averaged over the seal area and not catastrophic for the duration of the seal life. The seal material should be capable of a service life of more than 40,000 hours and dozens of thermal cycles for stationary systems. As the size of cells increases to realize the benefits of scaling power generation systems, the lack of dimensional flatness and parallelism in large cells, which cannot be controlled with existing manufacturing methods, needs to be addressed. The lack of parallelism between adjacent solid oxide fuel cell components will be particularly detrimental for the operation of the fuel cell when these components need to be sealed off. It is therefore important to develop economical seals that can accommodate the lack of dimensional uniformity between components while maintaining the functional sealing requirements. Manufacturability and cost-effectiveness of seals are additional factors for successful commercialization of solid oxide fuel cell technology.

SUMMARY OF THE INVENTION

A seal for a solid oxide fuel cell comprises a glass matrix having glass percolation therethrough and having a glass transition temperature below 650° C. A deformable second phase material is dispersed in the glass matrix. The second phase material can be a compliant material. The second phase material can be a crushable material.

The second phase material can have at least 10% deformation. The second phase material can have from 10% to 50% deformation. The second phase material can have a coefficient of thermal expansion within 20% of the coefficient of thermal expansion of the glass matrix.

The second phase material comprises at least one selected from the group consisting of rods, fibers, spheres and particles. The second phase material can have a maximum dimension of 10 micrometers to 1 mm. The second phase material can be at least one selected from the group consisting of zirconium oxide hollow spheres, zirconium oxide solid spheres, silicate hollow spheres, silicate solid spheres, zirconium oxide fibers, and zirconium oxide fiber mats.

There can be an absence of percolating crystalline glass precipitates through the glass matrix. The glass matrix can have a viscosity of between $10^5$ and $10^9$ Pa·s at 850° C. The glass matrix can have an electrical resistivity of greater than $10^4$ Ohm cm. The glass matrix can comprise from 1% to 15 wt. % Ba.

The seal can have a fuel leakage rate less than or equal to 1% of the fuel flow rate. The seal can have a permeability to mixtures comprising at least one selected from the group consisting of air, water vapor, and hydrogen of no more than the fuel leakage rate.

The glass matrix can have a coefficient of thermal expansion within 20% of the coefficient of thermal expansion of the electrolyte. The glass matrix can have a coefficient of thermal expansion within 20% of the coefficient of thermal expansion of 8 mol % yttria stabilized zirconium oxide. The glass matrix wets at least one selected from the group consisting of 8YSZ and aluminum oxide with a contact angle less than 90°.

The seal can comprise higher operating temperature portions and lower operating temperature portions. The higher temperature portions can have a greater concentration of the second phase material than the lower temperature portions.

A fuel cell comprises an anode, a cathode, an electrolyte, one or more glass seals, and can have one or more interconnects. The glass seal comprises a glass matrix having glass percolation therethrough and having a glass transition temperature below 650° C. A deformable second phase material is dispersed in the glass matrix. The glass matrix can have a coefficient of thermal expansion within 20% of the coefficient of thermal expansion of the electrolyte.

A precursor for forming a seal for a solid oxide fuel cell can comprise a glass matrix having glass percolation therethrough and having a glass transition temperature below 650° C. A second phase material is dispersed in the glass matrix. A binder can also be provided. The second phase material can be a compliant material. The second phase material can be a crushable material.

The binder can be at least one selected from the group consisting of polyvinyl butyral, polyethlene, polyethylene oxide, polyethylene glycol, acrylics, acrylates, latex, polyester, polysaccharides, polyvinyl alcohol, polypropylene, polyvinyl acetate, polymethyl methacrylate, cellulose, and waxes.

A method of making a seal for a fuel cell includes the step of applying a seal precursor comprising a glass matrix having glass percolation therethrough and having a glass transition temperature below 650° C. A second phase material is dispersed in the glass matrix. The precursor can also include a binder. Pressure is applied to the seal precursor such that the second phase material undergoes a deformation of at least 10%.

BRIEF DESCRIPTION OF THE DRAWINGS

There are shown in the drawings embodiments that are presently preferred it being understood that the invention is not limited to the arrangements and instrumentalities shown, wherein:

FIG. 7(a)-(c) is a schematic illustration of the preparation of the seal between irregular surfaces.

DETAILED DESCRIPTION OF THE INVENTION

A seal for a solid oxide fuel cell (SOFC) comprises a glass matrix having glass percolation therethrough and having a glass transition temperature below 650° C. A deformable second phase material is dispersed in the glass matrix. The second phase material can be a compliant material. The second phase material can be a crushable material.

The second phase, which can include additional phases, is chemically compatible with the glass matrix for the intended service life of the seal. It is compliant or frangible under the application of compressive stresses. It has a coefficient of thermal expansion comparable to that of the glass matrix. In the case of frangible phases, the particles of second phase material have a distribution of particle sizes that match the dimensional requirements of specific SOFC designs such as to address lack of flatness and/or parallelism. In the case of layers cast or molded to replicate a surface the second phase particles have dimensions to fit the requirements of specific SOFC design topographical features, such as the distribution of roughness amplitudes for the specific SOFC designs.

The second phase material can have at least 10% deformation. The second phase material can have from 10% to 50% deformation, or any amount of deformation there between. The second phase material can have a coefficient of thermal expansion within 20% of the coefficient of thermal expansion of the glass matrix. The term deformation as used herein means the average change in length, diameter, or largest dimension of the second phase particle divided by the average length, diameter or largest dimension of the second phase material prior to deformation. Deformations of greater than 50% are also possible.

The second phase material comprises at least one selected from the group consisting of rods, fibers, spheres and particles. The second phase material can have a maximum dimension of 10 micrometers to 1 mm. The second phase material can be at least one selected from the group consisting of zirconium oxide hollow spheres, zirconium oxide solid spheres, silicate hollow spheres, silicate solid spheres, zirconium oxide fibers, and zirconium oxide fiber mats. The second phase material can be any material that is chemically compatible with the glass, that has a coefficient of thermal expansion comparable to that of the glass and that is compliant. Silicates and oxide ceramics can be suitable second phase materials.

The glass matrix is "self-healing" meaning that at the temperature of operation of the fuel cell the glass flows into cracks to fill or "heal" these cracks. The glass matrix is selected so that it maintains a glass transition temperature below the lower bound of the SOFC operating temperature (650° C.) and retains suitable viscosity to the upper bound (850° C.), over the life of the seal. The glass matrix should have glass percolation there through. The glass can thereby mend cracks at temperatures above its glass transition temperature that might have formed during cooling in a previous thermal cycle. In addition, the glass matrix wets the surface of solid oxide fuel cell components to which it makes contact, such as 8YSZ (8 mol % yttria-stabilized zirconia) and alumina. The chemical composition of the glass matrix is such that it is resistant to devitrification within the SOFC environment.

The glass matrix should have a chemical composition such that its rate of crystallization is low so that a matrix of connected glass exists in the seal for its intended service life and the material retains its glassy characteristics over the expected service lifetime. The presence of compounds such as barium in the glass matrix serve as network modifiers. Barium alkali silicate glasses such as commercially available SCN-1 (SEM-COM Company, Inc. Toledo, Ohio) and G6 (Whatman, Piscataway, N.J.) glasses) with less than 15% Ba (by weight), have been shown to meet these requirements. The glass matrix can comprise from 1% to 15 wt. % Ba, or from 5% to 15 wt. % Ba. The composition of SCN-1 and G-6 glass is shown in Table 1:

TABLE I

Chemical Compostition of SCN-1 Glass; G6 Glass

| Element | Weight % | |
|---------|----------|---|
|         | ICP-MS   | ICP-AES |
| SCN-1   |          |   |
| Si      | 51.9     | 54.8 |
| K       | 15.0     | 13.4 |
| Ba      | 14.0     | 12.9 |
| Na      | 9.8      | 8.3 |
| Ca      | 3.9      | 5.0 |
| Al      | 3.4      | 3.4 |
| Mg      | 1.2      | 1.3 |
| Ti      | 0.5      | 0.6 |
| B       | 0.1      | 0.1 |
| Zn      | 0.1      | 0.0 |
| G6      |          |   |
| Si      | 50.5     | 53.4 |
| Na      | 15.5     | 12.6 |
| Ba      | 7.7      | 7.2 |
| B       | 6.3      | 6.0 |
| Zn      | 5.8      | 5.8 |
| Al      | 5.2      | 5.1 |
| Ca      | 4.1      | 5.0 |
| K       | 3.2      | 3.2 |
| Mg      | 1.5      | 1.6 |
| Fe      | 0.2      | 0.1 |

There should be glass percolation through the glass matrix. There can be an absence of percolating crystalline glass precipitates through the glass matrix. Percolation refers to the presence of an uninterrupted path of the referenced phase through the material, even if non-linear. The glass matrix can have a viscosity of between $10^5$ and $10^9$ Pa·s at 850° C. The glass matrix should have high electrical resistivity. The glass matrix and/or composite seal can have an electrical resistivity of greater than $10^4$ Ohm cm.

The seal should be impermeable to air and gas mixtures of water vapor and hydrogen for the intended service life of the seal. The seal can have a fuel leakage rate less than or equal to 0.5% of the fuel flow rate, or less than or equal to 1% of the fuel flow rate. The seal can have a permeability to mixtures comprising at least one selected from the group consisting of air, water vapor, and hydrogen of no more than the fuel leakage rate as specified for the SOFC.

The glass matrix should have a coefficient of thermal expansion close to that of the SOFC components which it contacts, such as zirconium oxide or the electrolyte used in the SOFC. The glass matrix can have a coefficient of thermal expansion within 20% of the coefficient of thermal expansion of the electrolyte. The glass matrix can have a coefficient of thermal expansion that is the same or within 20% of the coefficient of thermal expansion of 8 mol % yttria stabilized zirconium oxide, or any percentage to 20%. The glass matrix wets at least one selected from the group consisting of 8YSZ and aluminum oxide with a contact angle less than 90° at the temperatures of operation of the SOFC.

The seal can comprise higher operating temperature portions and lower operating temperature portions. The higher temperature portions can have a greater concentration of the second phase material than the lower temperature portions.

Figure 1:
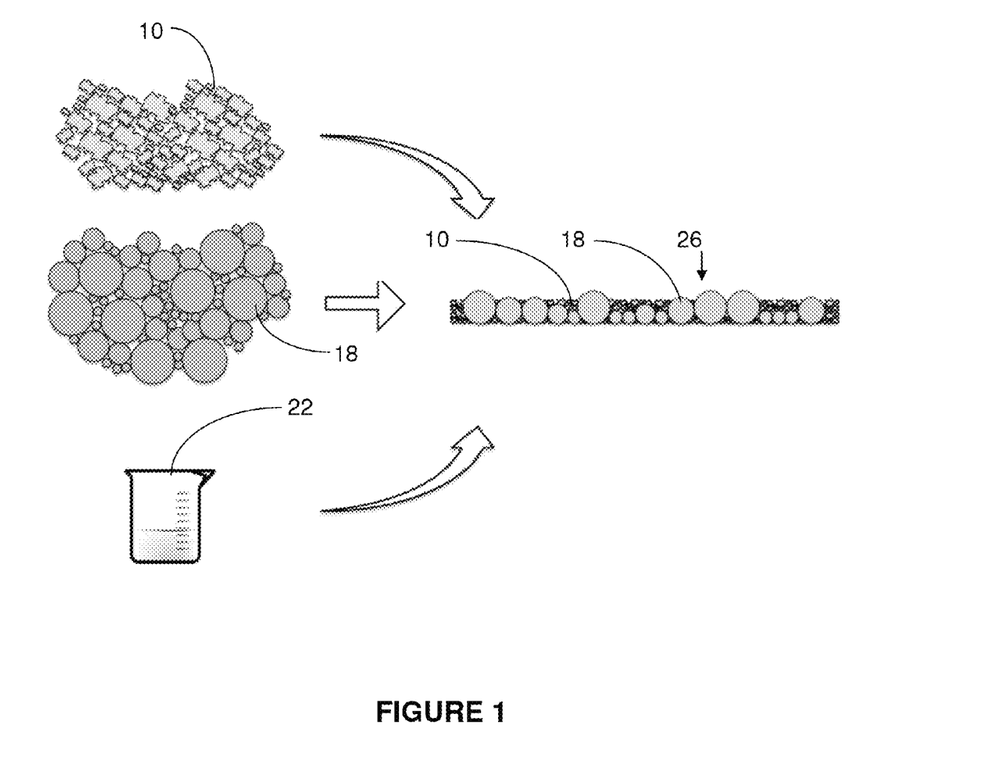
FIG. 1 is a schematic diagram of the preparation of a seal precursor according to the invention.

A method of making a seal for a fuel cell is illustrated in FIG. 1. The glass matrix 10 is combined with second phase material 18 and a suitable binder 22. The materials are combined into a precursor seal layer 26. The precursor seal layer is applied to the fuel cell stack by suitable methods. The binder is organic and will usually be removed upon reaching the operating temperatures of the fuel cell.

Pressure is applied to the seal precursor such that the second phase material undergoes a deformation of at least 10%. The pressure that is applied can be the weight of the fuel cell stack components themselves, and optionally external pressure if necessary to form a seal that properly conforms to the surface topology of the adjacent SOFC components. Fuel cell components have some degree of surface irregularity or roughness and the invention permits the formation of a seal which conforms to the surface topology of adjacent components.

Figure 2:
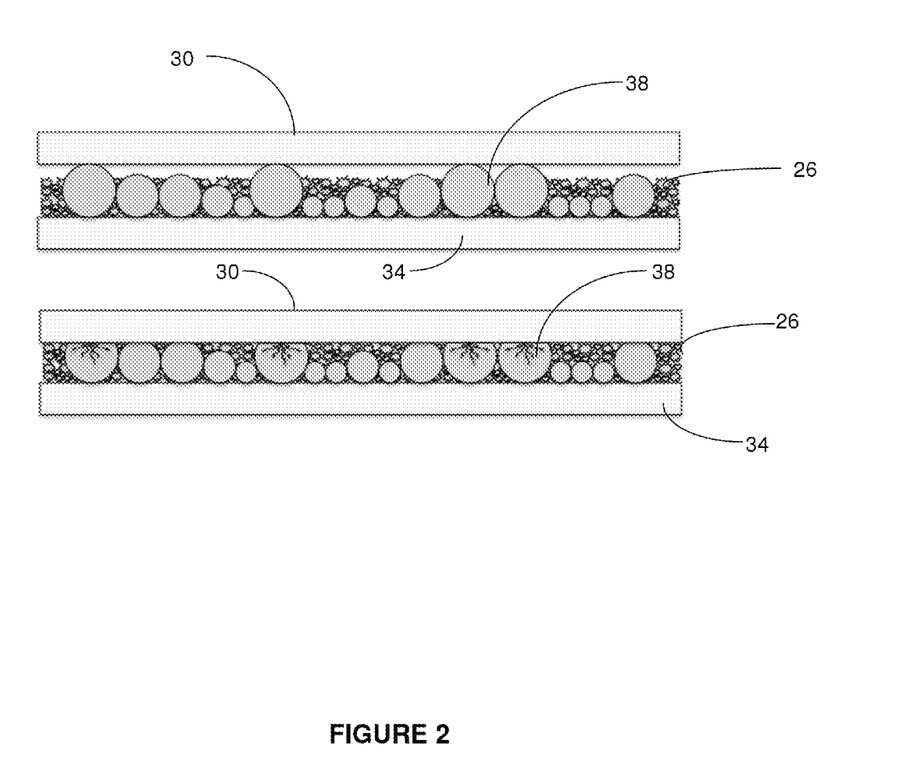
FIG. 2 is a schematic diagram illustrating a method of making a glass seal according to the invention using a crushable second phase material.

An example of the formation of the seal is shown in FIG. 2. The seal precursor layer 26 including glass matrix and large diameter second phase material 38 is applied between fuel cell components 30 and 34 (top figure). Upon the application of external pressure (bottom figure), the large diameter second phase material particles 38 are deformed by fracturing and a tight seal is thereby formed between the fuel cell components 30 and 34.

Figure 3:
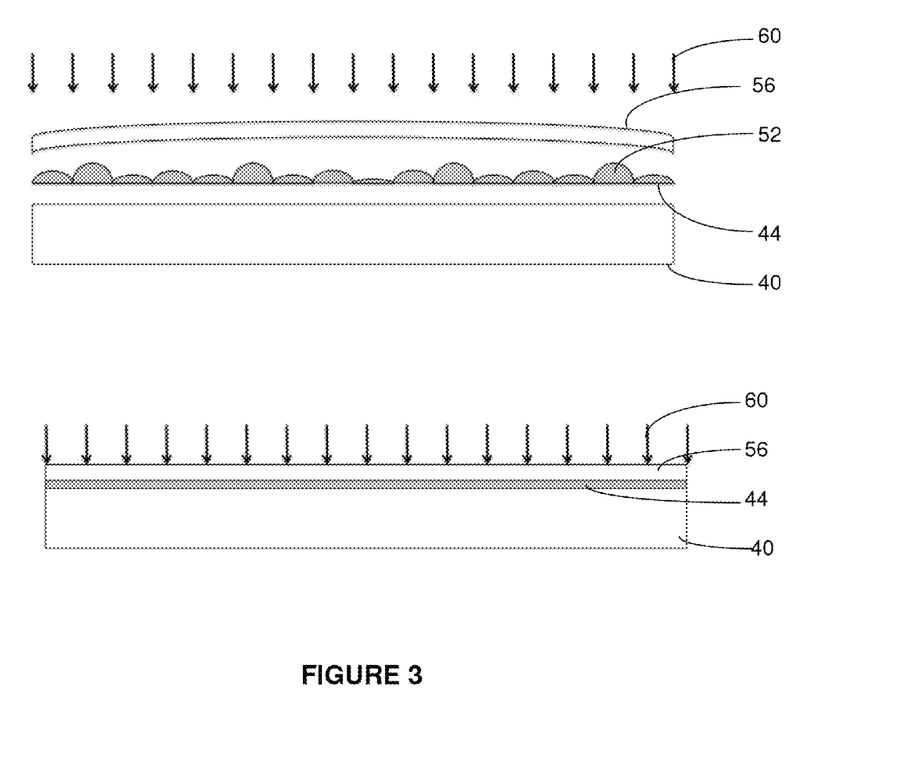
FIG. 3 is a schematic diagram illustrating a method of making a glass seal according to the invention using a compliant second phase material.

There is shown in FIG. 3 a fuel cell component 40, a precursor glass seal layer 44 and another fuel cell component 56. The fuel cell component 56 is irregular in surface topology. The component 56 is shown as having a largest curved surface for purposes of illustration, however, it will be appreciated that the principles herein are equally applicable to small surface irregularities. The precursor glass seal layer 44 in this embodiment is comprised of large diameter second phase material particles 52 which are made of a deformable compliant material (top figure). An applied pressure illustrated by arrows 60 forces the fuel cell component 56 against the glass precursor layer 52 and compresses the compliant second phase material particles 52. The surface irregularity is filled and the glass seal layer 44 fills the space between the fuel cell components 40 and 56 (bottom figure).

Figure 4:
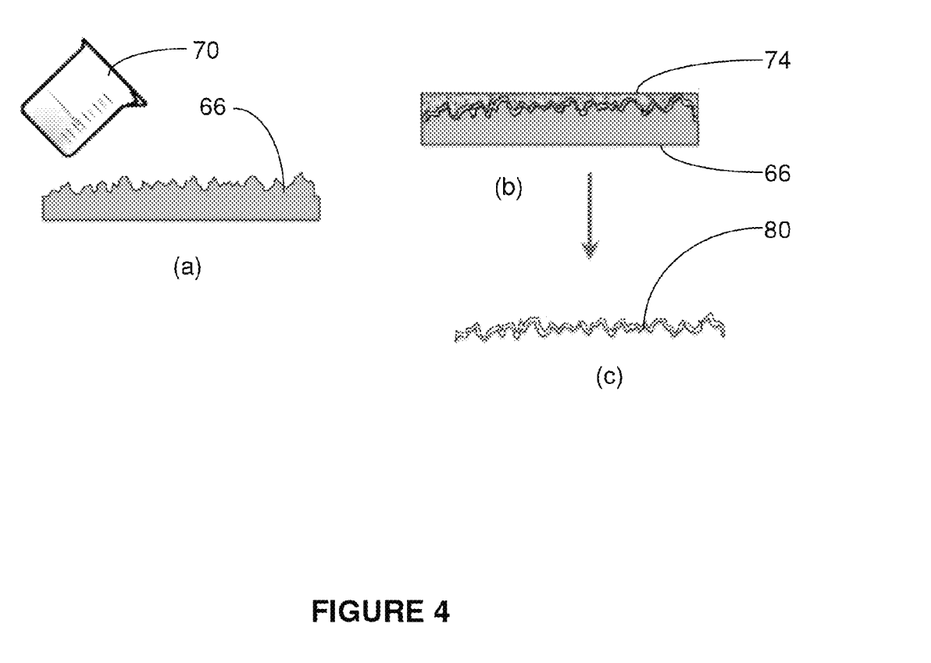
FIG. 4 is a schematic diagram illustrating a process of casting a glass seal according to the invention.

A method of casting a glass seal according the invention is shown in FIG. 4. A template 66 having the desired surface topology is utilized as shown in FIG. 4(a). The glass seal precursor 70 including glass matrix, second phase material and binder is applied to the template 66 as shown in FIG. 4(b) and covered with a castable ceramic 74. Pressure is applied to produce a glass seal 80 having a desired surface topology as shown in FIG. 4(c). The glass seal 80 can be removed from the template 66 and the ceramic layer 74 can be removed so that the glass seal 80 can be incorporated into the fuel cell.

Figure 5:
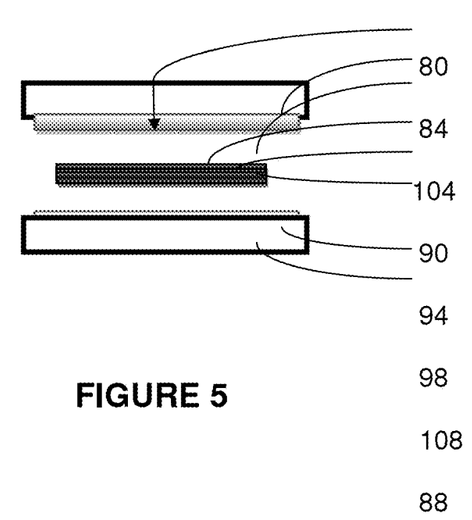
FIG. 5 is a schematic diagram of a solid oxide fuel cell.

The invention can be used with many different solid oxide fuel cell designs such as planar SOFCs such as cell-to-edge designs and cell-to-frame designs. A schematic diagram of a fuel cell according to the invention is shown in FIG. 5. The fuel cell 80 comprises a cathode 90, an electrolyte 94, an anode 98, and glass seals 104 and 108 between interconnects 84 and 88. The interconnects 84 and 88 can be ceramic or metallic, with the latter being preferred because of lower cost. There is currently work to coat these metallic interconnects with either zirconia or alumina and the glass seal will be in contact with these coated interconnects on one side and with the electrolyte on the other.

The glass seals 104 and 108 comprise a glass matrix having glass percolation therethrough and having a glass transition temperature below 650° C. A deformable second phase material is dispersed in the glass matrix. The glass matrix can have a coefficient of thermal expansion within 20% of the coefficient of thermal expansion of the electrolyte.

A precursor for forming a seal for a solid oxide fuel cell can comprise a glass matrix having glass percolation therethrough and having a glass transition temperature below 650° C. A second phase material is dispersed in the glass matrix. A binder can also be provided. The second phase material can be a compliant material. The second phase material can be a crushable material.

The binder can be at least one selected from the group consisting of polyvinyl butyral, polyethlene, polyethylene oxide, polyethylene glycol, acrylics, acrylates, latex, polyester, polysaccharides, polyvinyl alcohol, polypropylene, polyvinyl acetate, polymethyl methacrylate, cellulose, and waxes.

Figure 6:
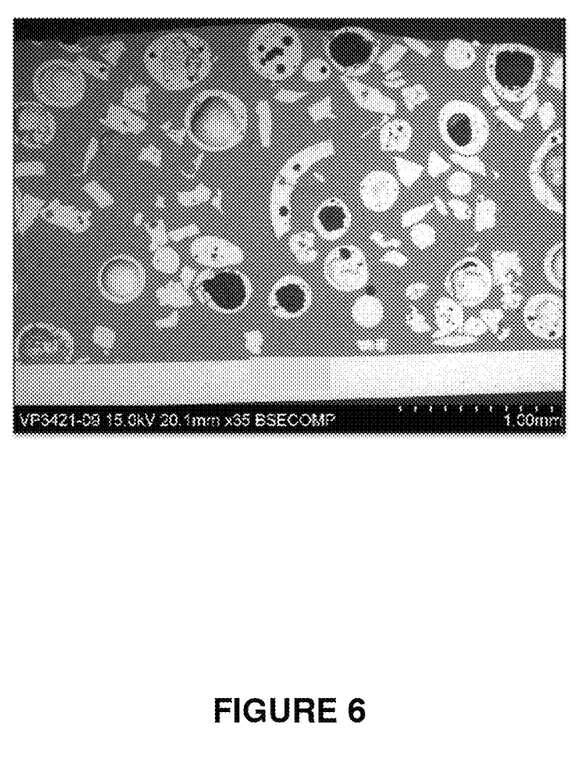
FIG. 6 is an image of frangible calcia-stabilized zirconia particles in SCN glass matrix sintered on top of an 8YSZ substrate.
Figure 7:
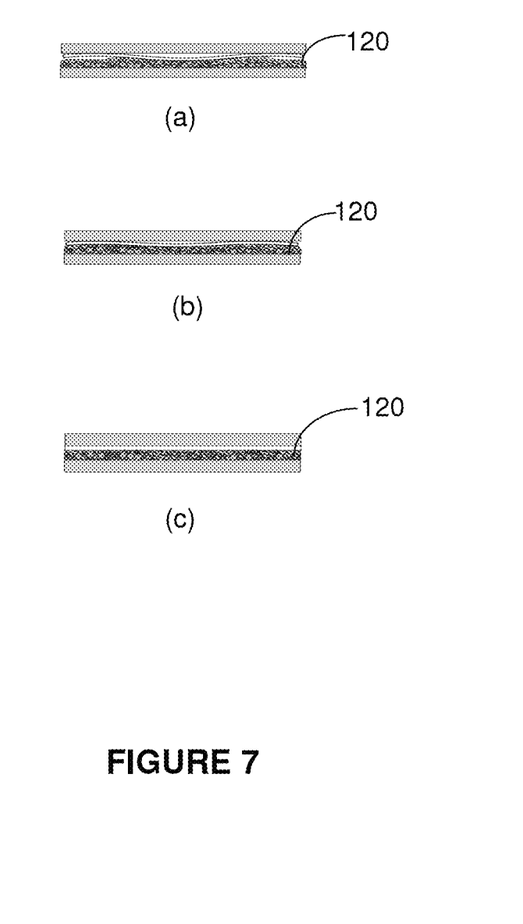

The engineered glass seals are prepared by mixing the glass matrix in powder form with an organic binder and the second phase. The material can be sintered. FIG. 6 is an image of frangible calcia-stabilized zirconia particles in SCN glass matrix sintered on top of an 8YSZ substrate. FIG. 7(a)-(c) is a schematic illustration of the preparation of the seal 120 between irregular surfaces.

The invention can be embodied in other forms without departing from the spirit or essential attributes thereof. Accordingly, reference should be made to the following claims to determine the scope of the invention.

We claim:

1. A seal for a solid oxide fuel cell, comprising:
   a barium alkali silicate glass matrix having glass percolation there through and having a glass transition temperature below 650° C.; and
   a frangible calcia-stabilized zirconia second phase material dispersed in the glass matrix; and
   wherein the seal when applied to the solid oxide fuel cell is impermeable to hydrogen and water vapor, defined as a fuel leakage rate of less than or equal to 1% of the fuel flow rate.

2. The seal of claim 1, wherein the second phase material is a compliant material.

3. The seal of claim 1, wherein the second phase material is a crushable material.

4. The seal of claim 1, wherein the second phase material has at least 10% deformation.

5. The seal of claim 1, wherein the second phase material has from 10% to 50% deformation.

6. The seal of claim 1, wherein the second phase material has a coefficient of thermal expansion within 20% of the coefficient of thermal expansion of the glass matrix.

7. The seal of claim 1, wherein the second phase material comprises at least one selected from the group consisting of rods, fibers, spheres and particles.

8. The seal of claim 7, where the second phase material has a maximum dimension of 10 micrometers to 1 mm.

9. The seal of claim 1, wherein the second phase material is at least one selected from the group consisting of zirconium oxide hollow spheres, zirconium oxide solid spheres, silicate hollow spheres, silicate solid spheres, zirconium oxide fibers, and zirconium oxide fiber mats.

10. The seal of claim 1, wherein there is an absence of percolating crystalline glass precipitates through the glass matrix.

11. The seal of claim 1, wherein the glass matrix has a viscosity of between $10^5$ and $10^9$ Pa·s at 850° C.

12. The seal of claim 1, wherein the glass matrix has an electrical resistivity of greater than $10^4$ Ohm cm.

13. The seal of claim 1, wherein the glass matrix comprises from 1% to 15 wt % Ba.

14. The seal of claim 1, wherein the glass matrix has a coefficient of thermal expansion within 20% of the coefficient of thermal expansion of the electrolyte.

15. The seal of claim 1, wherein the glass matrix has a coefficient of thermal expansion within 20% of the coefficient of thermal expansion of 8 mol % yttria stabilized zirconium oxide.

16. The seal of claim 1, wherein the glass matrix wets at least one selected from the group consisting of 8YSZ and aluminum oxide with a contact angle less than 90°.

17. The seal of claim 1, wherein said seal comprises higher operating temperature portions and lower operating temperature portions, the higher temperature portions having a greater concentration of the second phase material than the lower temperature portions.

18. A fuel cell, comprising:
 an anode;
 a cathode;
 an electrolyte; and
 a glass seal, comprising
  a barium alkali silicate glass matrix having glass percolation there through and having a glass transition temperature below 650° C.; and
  a frangible calcia-stabilized zirconia second phase material dispersed in the glass matrix; and
  wherein the seal when applied to the solid oxide fuel cell is impermeable to hydrogen and water vapor, defined as a fuel leakage rate of less than or equal to 1% of the fuel flow rate.

19. The seal of claim 18, wherein the glass matrix has a coefficient of thermal expansion within 20% of the coefficient of thermal expansion of the electrolyte.

* * * * *